United States Patent
Luo et al.

(10) Patent No.: US 12,200,752 B2
(45) Date of Patent: Jan. 14, 2025

(54) DATA TRANSMISSION METHOD, APPARATUS, AND STORAGE MEDIUM

(71) Applicant: ZTE CORPORATION, Shenzhen (CN)

(72) Inventors: Wei Luo, Shenzhen (CN); Lin Chen, Shenzhen (CN); Mengzhen Wang, Shenzhen (CN); Boyuan Zhang, Shenzhen (CN)

(73) Assignees: ZTE CORPORATION, Shenzhen (CN); XI'AN ZTE NEW SOFTWARE CO., LTD., Xi'an (CN)

( * ) Notice: Subject to any disclaimer, the term of this patent is extended or adjusted under 35 U.S.C. 154(b) by 306 days.

(21) Appl. No.: 17/633,880

(22) PCT Filed: Jun. 15, 2020

(86) PCT No.: PCT/CN2020/096061
§ 371 (c)(1),
(2) Date: Feb. 8, 2022

(87) PCT Pub. No.: WO2021/022907
PCT Pub. Date: Feb. 11, 2021

(65) Prior Publication Data
US 2022/0330265 A1    Oct. 13, 2022

(30) Foreign Application Priority Data
Aug. 8, 2019 (CN) .......................... 201910731645.5

(51) Int. Cl.
H04W 72/10    (2009.01)
H04W 72/04    (2023.01)
(Continued)

(52) U.S. Cl.
CPC ........... *H04W 72/56* (2023.01); *H04W 72/20* (2023.01)

(58) Field of Classification Search
CPC ... H04W 72/20; H04W 72/21; H04W 72/569; H04W 76/11; H04W 76/14
See application file for complete search history.

(56) References Cited

U.S. PATENT DOCUMENTS

2018/0007606 A1    1/2018    Lee et al.
2018/0234995 A1    8/2018    Jung et al.
(Continued)

FOREIGN PATENT DOCUMENTS

CN    107950047 A    4/2018
CN    109891987 A    6/2019
(Continued)

OTHER PUBLICATIONS

Indian Office Action in Application 202227012100, dated Aug. 2, 2022, 5 pages including English translation.
(Continued)

*Primary Examiner* — Awet Haile
(74) *Attorney, Agent, or Firm* — Morgan, Lewis & Bockius LLP

(57) ABSTRACT

Provided are a data transmission method and apparatus and a storage medium. The method includes: in a case where a user equipment (UE) determines that the UE is incapable of simultaneously transmitting uplink (UL) traffic and sidelink (SL) traffic, comparing a priority of a UL channel with a priority of an SL channel, and transmitting traffic according to a comparison result.

20 Claims, 3 Drawing Sheets

(51) Int. Cl.
 *H04W 72/20* (2023.01)
 *H04W 72/56* (2023.01)

(56) References Cited

U.S. PATENT DOCUMENTS

| | | | | |
|---|---|---|---|---|
| 2021/0153065 A1* | 5/2021 | Adjakple | ............... | H04W 80/02 |
| 2022/0116959 A1* | 4/2022 | Li | ............... | H04W 76/14 |
| 2022/0201731 A1* | 6/2022 | Lee | ............... | H04W 72/569 |
| 2022/0264590 A1* | 8/2022 | Han | ............... | H04L 1/1854 |
| 2023/0109359 A1* | 4/2023 | Back | ............... | H04L 27/26 |
| | | | | 370/329 |

FOREIGN PATENT DOCUMENTS

| | | |
|---|---|---|
| CN | 110536354 A | 12/2019 |
| WO | WO2018074876 A1 | 4/2018 |
| WO | WO2018141952 A1 | 8/2018 |
| WO | WO-2020030118 A1 | 2/2020 |

OTHER PUBLICATIONS

Extended European Search Report in Application No. 208490409, dated Aug. 8, 2023, 18 pages.

MediaTek Inc., "Prioritization of UL and SL transmission", 3GPP TSG-RAN WG2 Meeting #106, R2-1906337, Reno, US, May 13-17, 2019.

"3rd Generation Partnership Project; Technical Specification Group Services and System Aspects; System Architecture for the 5G System; Stage 2 (Release 16)", 3GPP TS 23.501 V16.1.0 (Jun. 2019).

"3rd Generation Partnership Project; Technical Specification Group Services and System Aspects; Architecture enhancements for 5G System (SGS) to support Vehicle-to-Everything (V2X) services (Release 16)", 3GPP Standard; Technical Specification; 3GPP TS 23.287, v1.1.0 (Jul. 2019).

Intel Corporation, "UL/SL prioritization for NR V2X", 3GPP TSG-RAN WG2 Meeting 106, R2-1906433, May 17, 2019 (May 17, 2019), p. 2 paragraphs 2-3.

International Search Report for Application No. PCT/CN2020/096061, dated Sep. 18, 2020, 6 pages including English translation.

Nokia, et al., "Unresolved issues on SL and UL prioritization," 3GPP TSG-RAN WG2 Meeting #107bis, R2-1913147, Oct. 18, 2019 (Oct. 18, 2019), p. 2, section 2.2.

Search Report in Chinese Application No. 201910731645.5, dated Oct. 14, 2024, 8 pages including translation.

Office Action in Chinese Application No. 201910731645.5, dated Oct. 17, 2024, 16 pages including translation.

* cited by examiner

DATA TRANSMISSION METHOD, APPARATUS, AND STORAGE MEDIUM

CROSS-REFERENCE TO RELATED APPLICATIONS

This is a National Stage Application filed under 35 U.S.C. 371 based on International Patent Application No. PCT/CN2020/096061, filed on Jun. 15, 2020, which claims priority to Chinese Patent Application No. 201910731645.5 filed with the China National Intellectual Property Administration (CNIPA) on Aug. 8, 2019, the contents of which are incorporated herein by reference in their entireties.

TECHNICAL FIELD

The present application relates to the field of wireless communication networks, for example, to a data transmission method and apparatus, and a storage medium.

BACKGROUND

In the vehicle-to-everything (V2X) system, based on the objects of wireless communication, the vehicle-to-everything communication may incorporate three different types of communication: vehicle-to-vehicle (V2V), vehicle-to-infrastructure/vehicle-to-network (V2I/V2N), and vehicle-to-pedestrian (V2P). These three types of vehicle-to-everything communication are collectively referred to as V2X communication.

In the research of Long Term Evolution (LTE)-based V2X communication organized by the 3rd Generation Partnership Project (3GPP), V2X communication between user equipments (UEs) is one of the ways to implement V2X standards. As shown in FIG. 1, the communication mode where a source UE and a target UE directly perform transmission via an air interface through the sidelink is called PC5-based V2X communication or sidelink V2X communication.

However, a UE having a sidelink communication capability may need to send uplink data and sidelink data simultaneously. If the capability of the UE is limited or the UE suffers from co-channel interference and the like, the UE fails to send these two types of data simultaneously.

SUMMARY

The present application provides a data transmission method and apparatus, and a storage medium, which can solve the conflict issue when a UE transmits traffic.

An embodiment of the present application provides a data transmission method. The method includes that: in a case where a UE determines that the UE is incapable of simultaneously transmitting uplink (UL) traffic and sidelink (SL) traffic, a priority of a UL channel is compared with a priority of an SL channel; and the UE transmits traffic according to a comparison result.

An embodiment of the present application provides a data transmission method. The method includes that: in a case where at least one SL buffer status report (BSR) is triggered and not canceled, and in a case where a UE is allocated with a UL resource at a transmission time interval (TTI) and the UL resource is capable of accommodating the at least one SL BSR and a sub-header of the at least one SL BSR, the UE generates an SL BSR media access control (MAC) control element (CE).

An embodiment of the present application provides a data transmission apparatus. The apparatus includes a determination module, a comparison module, and a communication module.

The determination module is configured to determine that the data transmission apparatus is incapable of simultaneously transmitting UL traffic and SL traffic.

The comparison module is configured to compare a priority of a UL channel with a priority of an SL channel.

The communication module is configured to transmit traffic according to a comparison result.

An embodiment of the present application provides a data transmission apparatus. The apparatus includes a determination module and a generation module.

The determination module is configured to determine that at least one SL BSR is triggered and not canceled.

The generation module is configured to, in a case where a UE is allocated with a UL resource at a TTI and the UL resource is capable of accommodating the at least one SL BSR and a sub-header of the at least one SL BSR, generate an SL BSR MAC CE.

An embodiment of the present application provides a computer-readable storage medium. The storage medium is configured to store a computer program. The computer program, when executed by a processor, implements any data transmission method in the embodiments of the present application.

DETAILED DESCRIPTION

Embodiments of the present application are described hereinafter in detail in conjunction with the drawings. It is to be noted that if not in collision, the embodiments described herein and the features thereof may be combined with each other.

In addition, in the embodiments of the present application, the word "optionally" or "exemplarily" is used herein to mean serving as an example, instance or illustration. Rather, use of the word "optionally" or "exemplarily" is intended to present concepts in a concrete fashion.

The embodiments of the present application may be applied to the scenario of sidelink communication, specifically, to sidelink unicast, sidelink multicast and sidelink broadcast, and can achieve the effect of determining the transmission sequence of traffic by a reasonable resource allocation scheme when a device transmits traffic and if there is a resource conflict, that is, if the device cannot simultaneously transmit all traffic.

Figure 1:
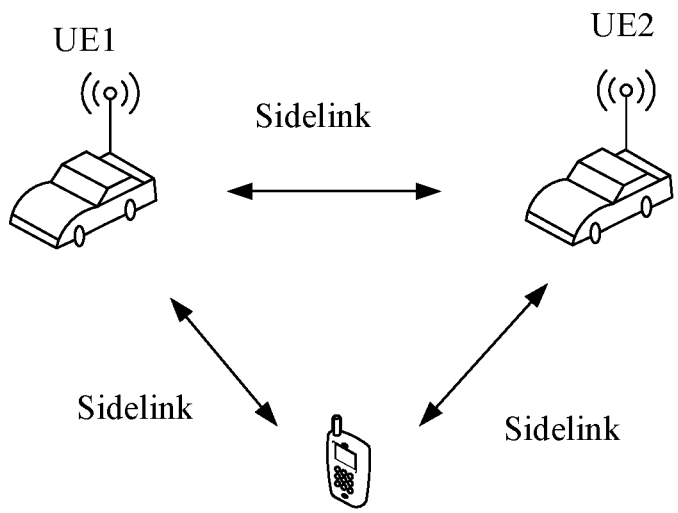
FIG. 1 is a schematic diagram of V2X communication in the related art.
Figure 2:
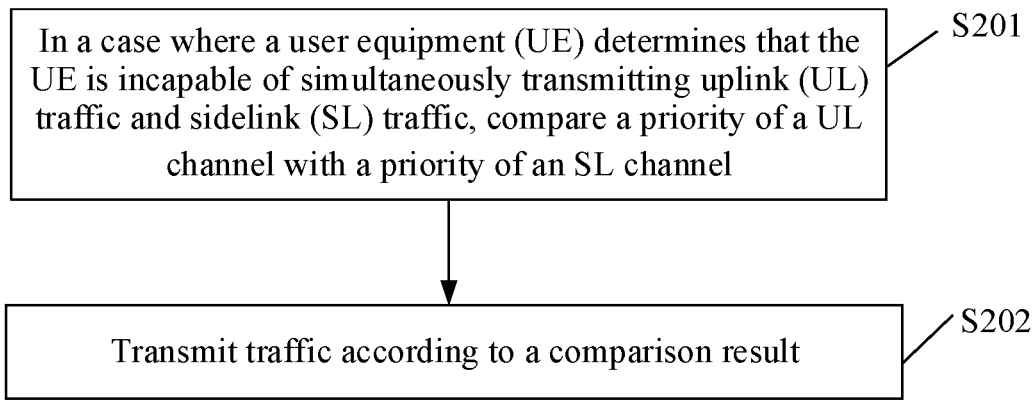
FIG. 2 is a flowchart of a data transmission method according to an embodiment.

FIG. 2 is a flowchart of a data transmission method according to an embodiment. As shown in FIG. 2, the method provided by this embodiment includes S201 and S202 described below.

In S201, if a UE determines that the UE is incapable of simultaneously transmitting UL traffic and SL traffic, a priority of a UL channel is compared with a priority of an SL channel.

Exemplarily, when multiple pieces of traffic are transmitted at different frequency points and need to share a transmission link of the UE, or when multiple pieces of traffic are transmitted at the same frequency point and if the UE cannot simultaneously transmit multiple pieces of traffic because the capability of the UE is limited or the data transmission suffers from co-channel interference, the UE determines that at this moment, the UE itself cannot simultaneously transmit the UL traffic and the SL traffic.

Then, the UE compares the priority of the SL channel with the priority of the UL channel to preferentially transmit traffic carried on a channel having a higher priority.

In S202, the UE transmits traffic according to a comparison result.

When the comparison result determined by the UE is that the priority of the SL channel is higher than the priority of the UL channel, the UE preferentially transmit the SL traffic.

In an embodiment, the embodiment of the present application provides an implementation mode of determining that the priority of the SL channel is higher than the priority of the UL channel: a logical channel priority of the SL channel is determined to be higher than a logical channel priority of the UL channel.

Exemplarily, the logical channel priority of the SL channel may be determined to be higher than the logical channel priority of the UL channel in manners one to seven described below.

In manner one, a value of the logical channel priority of the SL channel is less than a value of the logical channel priority of the UL channel.

It is to be understood by those skilled in the art that the smaller the value of the priority, the higher the priority ranking, that is, the higher the priority.

It is to be noted that in the embodiment of the present application, the described value of the logical channel priority may be the highest value of the priority of the logical channel.

In manner two, the value of the logical channel priority of the SL channel is less than a first threshold and the value of the logical channel priority of the SL channel is less than the value of the logical channel priority of the UL channel.

In an embodiment, the first threshold may be acquired in the following manner: a network side sends the first threshold to the UE through a system message or a radio resource control (RRC) message.

In manner three, the value of the logical channel priority of the UL channel is greater than a second threshold and the value of the logical channel priority of the SL channel is less than the first threshold.

When the following two conditions are both satisfied: the value of the logical channel priority of the UL channel is greater than the second threshold and the value of the logical channel priority of the SL channel is less than the first threshold, the logical channel priority of the SL channel is determined to be higher than the logical channel priority of the UL channel, and the UE preferentially transmit the SL traffic on the SL channel.

Likewise, the second threshold involved in this embodiment of the present application may also be sent by the network side to the UE through a system message or an RRC message.

In manner four, the value of the logical channel priority of the UL channel is greater than the second threshold and a latency parameter of an SL packet is less than a first latency threshold.

When the value of the logical channel priority of the UL channel is greater than the second threshold, it means that the logical channel priority of the UL channel is ranked low and the priority is low. Meanwhile, when the latency parameter of the SL packet is less than the first latency threshold, it means that the latency of the SL packet is small. Therefore, the SL packet may be transmitted preferentially. Since the SL packet is transmitted on the SL channel, it can be considered that the logical channel priority of the SL channel is higher than the logical channel priority of the UL channel.

The first latency threshold may be acquired in the following manner: the network side sends the first latency threshold to the UE through a system message or an RRC message.

In manner five, the value of the logical channel priority of the SL channel is less than the value of the logical channel priority of the UL channel and a value of a priority of a MAC CE.

When the value of the logical channel priority of the SL channel is less than both the value of the logical channel priority of the UL channel and the value of the priority of the MAC CE, it means that the logical channel priority of the SL channel is ranked before both the logical channel priority of the UL channel and the priority of the MAC CE, that is, the logical channel priority of the SL channel is higher.

In the embodiment of the present application, the value of the priority of the MAC CE may be acquired in the following implementation mode: the UE receives the value of the priority of the MAC CE sent by the network side through a system message or an RRC message.

The value of the priority of the MAC CE includes a value of a priority of each MAC CE of N MAC CEs, or a value of a priority uniformly configured by the network side for N MAC CEs, or a value of a priority configured by the network side for a non-padding MAC CE, or a value of a priority configured by the network side for a padding MAC CE, where N is a natural number.

In manner six, the latency parameter of the SL packet is less than the first latency threshold and the value of the logical channel priority of the SL channel is less than the value of the logical channel priority of the UL channel.

When the latency parameter of the SL packet is less than the first latency threshold, it means that the latency of the SL packet is small. In an embodiment, if the value of the logical channel priority of the SL channel is less than the value of the logical channel priority of the UL channel, it means that the logical channel priority of the SL channel is higher than the logical channel priority of the UL channel, and the UE may preferentially transmit the SL packet on the SL channel.

In manner seven, the value of the logical channel priority of the SL channel is less than the first threshold.

In an embodiment, when a MAC protocol data unit (PDU) of the UE includes no MAC CE, the logical channel priority of the SL channel may be determined to be higher than the logical channel priority of the UL channel in the following two implementation modes.

In the first implementation mode, the value of the logical channel priority of the SL channel is greater than the first threshold and the value of the logical channel priority of the SL channel is less than the value of the logical channel priority of the UL channel.

When the value of the logical channel priority of the SL channel is greater than the first threshold, if the value of the logical channel priority of the SL channel is less than the value of the logical channel priority of the UL channel, the logical channel priority of the SL channel may be determined to be higher than the logical channel priority of the UL channel.

In the second implementation manner, the latency parameter of the SL packet is greater than the first latency threshold and the value of the logical channel priority of the SL channel is less than the value of the logical channel priority of the UL channel.

When the latency parameter of the SL packet is greater than the first latency threshold, that is, when the latency of the SL packet is larger, if the value of the logical channel priority of the SL channel is less than the value of the logical channel priority of the UL channel, the logical channel priority of the SL channel may be determined to be higher than the logical channel priority of the UL channel.

In an embodiment, when a packet for multiple retransmissions is configured on the SL channel, the embodiment of the present application provides an implementation mode of determining that the priority of the SL channel is higher than the priority of the UL channel: a priority of SL MAC PDU retransmission traffic is higher than a priority of UL MAC PDU initial transmission traffic, where the SL MAC PDU retransmission traffic is transmitted on the SL channel and the UL MAC PDU initial transmission traffic is transmitted on the UL channel.

It is to be noted that the above-mentioned retransmission includes two cases: non-feedback-based retransmission and feedback-based retransmission.

Exemplarily, the priority of SL MAC PDU retransmission traffic may be determined to be higher than the priority of UL MAC PDU initial transmission traffic in the following manners one to three.

In manner one, the value of the logical channel priority of the SL channel is less than the first threshold and the value of the logical channel priority of the UL channel is greater than a third threshold.

When the following two conditions are both satisfied: the value of the logical channel priority of the SL channel is less than the first threshold and the value of the logical channel priority of the UL channel is greater than the third threshold, the priority of SL MAC PDU retransmission traffic is determined to be higher than the priority of UL MAC PDU initial transmission traffic, that is, the priority of the SL channel is higher than the priority of the UL channel.

Likewise, the third threshold may also be acquired in the following manner: the network side sends the third threshold to the UE through a system message or an RRC message.

In manner two, a value of a priority of the SL MAC PDU retransmission traffic is less than a fourth threshold.

When the value of the priority of the SL MAC PDU retransmission traffic is less than the fourth threshold, it means that the priority of the SL MAC PDU retransmission traffic satisfies the following condition: the priority of SL MAC PDU retransmission traffic is higher than the priority of UL MAC PDU initial transmission traffic, that is, the priority of the SL channel transmitting the SL MAC PDU retransmission traffic is higher than the priority of the UL channel transmitting the UL MAC PDU initial transmission traffic.

Likewise, in this embodiment of the present application, the fourth threshold may be sent by the network side to the UE through a system message or an RRC message.

In manner three, the UE receives an indication message sent by the network side through a system message or an RRC message, where the indication message is used for indicating that the priority of the SL MAC PDU retransmission traffic is higher than the priority of the UL MAC PDU initial transmission traffic.

In an embodiment, when no logical channel priority of the SL channel is configured on the UE, the embodiment of the present application further provides an implementation mode: the UE receives a correspondence between a PC5 Quality of Service (QoS) flow identifier/PC5 5G QoS identifier (PFI/PQI) and a logical channel priority sent by the network side through a system message or an RRC message so that the UE determines the logical channel priority of the SL channel according to the correspondence.

When the comparison result determined by the UE is that the priority of the UL channel is higher than the priority of the SL channel, the UE preferentially transmits the UL traffic.

In an embodiment, the embodiment of the present application provides an implementation mode of determining that the priority of the UL channel is higher than the priority of the SL channel: the value of the logical channel priority of the UL channel is less than the second threshold.

When the value of the logical channel priority of the UL channel is less than the second threshold, the logical channel priority of the UL channel may be determined to be higher than the logical channel priority of the SL channel, that is, the priority of the UL channel is higher than the priority of the SL channel. At this point, the UE preferentially transmits the UL traffic on the UL channel.

Alternatively, the priority of the UL channel may be determined to be higher than the priority of the SL channel in the following implementation mode: a latency parameter of a UL packet is less than the first latency threshold.

When the latency parameter of the UL packet is less than the first latency threshold, it means that the latency of the UL packet is small, and the UL packet may be transmitted preferentially, that is, the priority of the UL channel is higher than the priority of the SL channel.

In an embodiment, when a packet for multiple retransmissions is configured on the SL channel, the embodiment of the present application provides an implementation mode of determining that the priority of the UL channel is higher than the priority of the SL channel: the UE receives an indication message sent by the network side through a system message or an RRC message, where the indication message is used for indicating that the priority of UL MAC PDU initial transmission traffic is higher than a priority of SL MAC PDU retransmission traffic, where the SL MAC PDU retransmission traffic is transmitted on the SL channel and the UL MAC PDU initial transmission traffic is transmitted on the UL channel.

It is to be noted that the above-mentioned retransmission includes two cases: non-feedback-based retransmission and feedback-based retransmission.

When the comparison result determined by the UE is that the priority of the SL channel is equal to the priority of the UL channel, the embodiment of the present application provides the following two implementation manners of determining the traffic transmission.

In manner one, the UE selects any one of the SL channel or the UL channel to transmit the traffic.

In manner two, the UE compares the priority of the SL channel with the priority of the UL channel based on at least one of a resource type, a packet error rate or a packet latency parameter, and preferentially transmits the traffic on a channel having a higher priority.

For example, in the SL channel and the UL channel, the channel with a smaller packet latency parameter has a higher priority.

However, for a PC5 signaling radio bearer (SRB), if the latency parameter of the SRB and the latency parameter of a data radio bearer (DRB) are the same, the UE may select any one of the SL channel or the UL channel to transmit traffic, or the priority of the SRB is higher than the priority of the DRB by default, that is, the channel transmitting the SRB has a higher priority.

It is well known to those skilled in the art that the PC5 is an interface defined on the sidelink, which is not described in detail herein.

When the SL traffic includes LTE SL traffic and New Radio (NR) SL traffic, if the UE cannot simultaneously transmit the LTE SL traffic and the NR SL traffic, the embodiment of the present application provides an optional implementation mode: if the value of the priority of the logical channel in an LTE SL MAC PDU is less than a value of a priority of a logical channel in an NR SL MAC PDU, the UE preferentially transmits the LTE SL traffic.

Otherwise, if the value of the priority of the logical channel in the LTE SL MAC PDU is greater than the value of the priority of the logical channel in the NR SL MAC PDU, the UE preferentially transmits the NR SL traffic.

When the UE accesses multiple cells in a multi-connection manner and needs to simultaneously transmit NR SL traffic, LTE SL traffic, NR UL traffic, and LTE UL traffic, if the UE cannot simultaneously transmit all SL traffic (for example, NR SL traffic and LTE SL traffic) and all UL traffic (for example, NR UL traffic and LTE UL traffic), the embodiment of the present application provides the following optional implementation mode.

The UE compares the priority of an NR SL logical channel, the priority of an LTE SL ProSe Per-Packet Priority (PPPP), the priority of an NR UL logical channel and the priority of an LTE UL logical channel, and preferentially transmits traffic having a higher priority.

The UE compares the value of the priority of the logical channel in the LTE SL MAC PDU with an LTE threshold, and if the value of the priority of the logical channel in the LTE SL MAC PDU is less than the LTE threshold, the priority of the LTE SL traffic is higher than the priority of the LTE UL traffic, and the UE preferentially transmits the LTE SL traffic.

Alternatively, the UE compares the value of the priority of the logical channel in the NR SL MAC PDU with an NR threshold, and if the value of the priority of the logical channel in the NR SL MAC PDU is less than the NR threshold, the priority of the NR SL traffic is higher than the priority of the NR UL traffic, and the UE preferentially transmits the NR SL traffic.

The LTE threshold and the NR threshold are sent by the network side through a system message or an RRC message to the UE.

When the UE accesses a certain cell and needs to simultaneously transmit NR SL traffic, LTE SL traffic and UL data traffic, if the UE cannot simultaneously transmit the SL traffic and the UL traffic, the embodiment of the present application provides an optional implementation mode: the UE compares the logical channel priority of the UL channel, the logical channel priority of NR SL and the priority of LTE SL PPPP, and preferentially transmits traffic having a higher priority.

When the UE accesses a certain base station and needs to simultaneously transmit NR SL traffic, LTE SL traffic and UL data traffic, if the UE cannot simultaneously transmit the SL traffic and the UL traffic, the embodiment of the present application provides the following optional implementation modes.

If the value of the logical channel priority of the NR SL is less than a preset threshold and the value of the logical channel priority of the LTE SL is greater than the preset threshold, the priority of the NR SL traffic is determined to be higher, and then the UE preferentially transmits the NR SL traffic, then transmits the LTE SL traffic; and when the UE has transmission capability or transmission resources, the UE transmits the UL data traffic.

Alternatively, if the value of the logical channel priority of the LTE SL traffic is less than the preset threshold and the value of the logical channel priority of the NR SL traffic is greater than the preset threshold, the priority of the LTE SL traffic is determined to be higher, and then the UE preferentially transmits the LTE SL traffic, then transmits the UL SL traffic; and when the UE has transmission capability or transmission resources, the UE transmits the UL data traffic.

Alternatively, if both the value of the logical channel priority of the NR SL and the value of the logical channel priority of the LTE SL are less than the preset threshold, the UE compares the logical channel priority of the NR SL with the priority of the LTE SL PPPP and preferentially transmits the SL traffic having a higher priority between the two types of traffic. When the UE has transmission capability or transmission resources, the UE sequentially transmits the SL traffic having a lower priority between the two types of SL traffic as well as the UL data traffic.

Alternatively, if both the value of the logical channel priority of the NR SL and the value of the logical channel priority of the LTE SL are less than the preset threshold, the UE compares the logical channel priority of the NR SL with the priority of the LTE SL PPPP and preferentially transmits the UL data traffic. When the UE has transmission capability or transmission resources, the UE sequentially transmits the two SL traffic according to the order of priorities.

In the data transmission method provided by the embodiment of the present application, when a UE determines that the UE is incapable of simultaneously transmitting UL traffic and SL traffic, the priority of a UL channel is compared with the priority of an SL channel, and traffic is transmitted according to a comparison result. In this manner, the traffic transmission sequence can be determined through a reasonable resource allocation scheme when the UE cannot simultaneously transmit all UL traffic and SL traffic, avoiding the conflict problem during traffic transmission.

Figure 3:
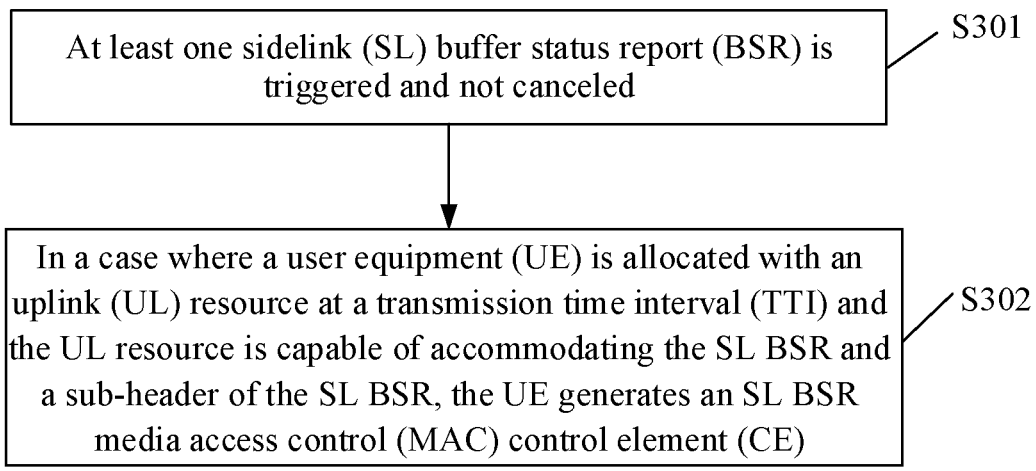
FIG. 3 is a flowchart of another data transmission method according to an embodiment.

FIG. 3 is a flowchart of another data transmission method according to an embodiment. As shown in FIG. 3, the method provided by this embodiment includes S301 and S302 described below.

In S301, at least one SL BSR is triggered and not canceled.

Exemplarily, in this embodiment of the present application, it may be determined for a MAC entity of the UE that at least one SL BSR is triggered and not canceled.

In S302, in a case where a UE is allocated with a UL resource at a TTI and the UL resource is capable of accommodating the SL BSR and a sub-header of the SL BSR, the UE generates an SL BSR MAC CE.

In an embodiment, in a case where the condition that the UE is allocated with a UL resource at a TTI and the UL resource is capable of accommodating the SL BSR and a sub-header of the SL BSR is satisfied, this embodiment of the present application also provides the steps described below.

If none of the generated SL BSRs is a truncated SL BSR, the UE starts or restarts a periodic SL BSR timer; and a retransmission SL BSR timer is started or restarted.

Otherwise, if the condition that the UE is allocated with a UL resource at a TTI and the UL resource is capable of accommodating the SL BSR and a sub-header of the SL BSR is not satisfied but the regular sidelink BSR is triggered, the following step is further provided.

If no uplink resource assignment is configured or if the available UL resources do not satisfy the logical channel prioritization (LCP) mapping limit that triggers the SL BSR, an SL scheduling request (SR) is triggered.

In addition, when the UE or the MAC entity in the UE has no data transmitted through the SL unicast logical channel, all SL BSRs triggered by the SL unicast are canceled.

Alternatively, when the UE or the MAC entity in the UE does not have a specific target identifier or data of an SL unicast logical channel of a target UE identifier, all SL BSRs triggered by an SL unicast logic related to the target identifier or the target UE identifier are canceled.

In an embodiment, when the MAC PDU is assembled and the MAC PDU includes an SL BSR triggered by the latest event or when the SL resource assignment is capable of accommodating all SL data to be transmitted, all SRs triggered by the SL BSR but not yet transmitted are canceled.

Otherwise, when the MAC PDU is assembled and the MAC PDU includes an UL BSR triggered by the latest event or when the UL resource assignment is capable of accommodating all UL data to be transmitted, all SRs triggered by the UL BSR but not yet transmitted are canceled.

Figure 4:
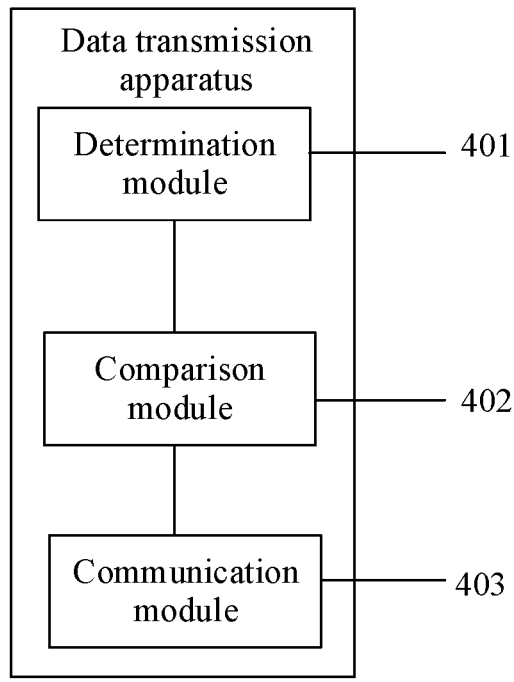
FIG. 4 is a structural schematic diagram of a data transmission apparatus according to an embodiment.

FIG. 4 is a structural schematic diagram of a data transmission apparatus according to an embodiment. As shown in FIG. 4, the apparatus provided by this embodiment includes a determination module 401, a comparison module 402, and a communication module 403.

The determination module 401 is configured to determine that the data transmission apparatus is incapable of simultaneously transmitting UL traffic and SL traffic.

The comparison module 402 is configured to compare a priority of a UL channel with a priority of an SL channel.

The communication module 403 is configured to transmit traffic according to a comparison result.

In an embodiment, the communication module 403 is configured to, when the comparison result is that the priority of the SL channel is higher than the priority of the UL channel, transmit the SL traffic.

A possible implementation mode for that the priority of the SL channel is higher than the priority of the UL channel is that a logical channel priority of the SL channel is higher than a logical channel priority of the UL channel.

In an embodiment, the logical channel priority of the SL channel may be determined to be higher than the logical channel priority of the UL channel in manners one to seven described below.

In manner one, a value of the logical channel priority of the SL channel is less than a value of the logical channel priority of the UL channel.

In manner two, the value of the logical channel priority of the SL channel is less than a first threshold and the value of the logical channel priority of the SL channel is less than the value of the logical channel priority of the UL channel.

In manner three, the value of the logical channel priority of the UL channel is greater than a second threshold and the value of the logical channel priority of the SL channel is less than the first threshold.

In manner four, the value of the logical channel priority of the UL channel is greater than the second threshold and a latency parameter of an SL packet is less than a first latency threshold.

In manner five, the value of the logical channel priority of the SL channel is less than the value of the logical channel priority of the UL channel and a value of a priority of a MAC CE.

In manner six, the latency parameter of the SL packet is less than the first latency threshold and the value of the logical channel priority of the SL channel is less than the value of the logical channel priority of the UL channel.

In manner seven, the value of the logical channel priority of the SL channel is less than the first threshold.

In an embodiment, the communication module 403 is configured to receive the value of the priority of the MAC CE sent by a network side through a system message or an RRC message.

The value of the priority of the MAC CE includes a value of a priority of each MAC CE of N MAC CEs, or a value of a priority uniformly configured by the network side for the N MAC CEs, or a value of a priority configured by the network side for a non-padding MAC CE, or a value of a priority configured by the network side for a padding MAC CE, where N is a natural number.

The communication module is further configured to receive the first latency threshold sent by the network side through a system message or an RRC message.

When a MAC PDU of the data transmission apparatus includes no MAC CE, the logical channel priority of the SL channel may be determined to be higher than the logical channel priority of the UL channel in the two implementation modes described below.

In the first implementation mode, the value of the logical channel priority of the SL channel is greater than the first threshold and the value of the logical channel priority of the SL channel is less than the value of the logical channel priority of the UL channel.

In the second implementation manner, the latency parameter of the SL packet is greater than the first latency threshold and the value of the logical channel priority of the SL channel is less than the value of the logical channel priority of the UL channel.

In an embodiment, when a packet for multiple retransmissions is configured on the SL channel, the priority of the SL channel is determined to be higher than the priority of the UL channel in another implementation mode described below.

A priority of SL MAC PDU retransmission traffic is higher than a priority of UL MAC PDU initial transmission traffic.

The SL MAC PDU retransmission traffic is transmitted on the SL channel and the UL MAC PDU initial transmission traffic is transmitted on the UL channel.

The priority of SL MAC PDU retransmission traffic may be determined to be higher than the priority of UL MAC PDU initial transmission traffic in the manners one to three described below.

In manner one, the value of the logical channel priority of the SL channel is less than the first threshold and the value of the logical channel priority of the UL channel is greater than a third threshold.

In manner two, a value of a priority of the SL MAC PDU retransmission traffic is less than a fourth threshold.

In manner three, the communication module 403 receives an indication message sent by the network side through a system message or an RRC message, where the indication message indicates that the priority of the SL MAC PDU retransmission traffic is higher than the priority of the UL MAC PDU initial transmission traffic.

It is to be noted that the above-mentioned retransmission includes two cases: non-feedback-based retransmission and feedback-based retransmission.

In an embodiment, the communication module 403 is configured to receive the first threshold, the second threshold, the third threshold or the fourth threshold sent by the network side through a system message or an RRC message.

When the comparison result determined by the determination module 401 is that the priority of the UL channel is higher than the priority of the SL channel, the communication module 403 is configured to preferentially transmit the UL traffic.

In an embodiment, the embodiment of the present application provides an implementation mode of determining that the priority of the UL channel is higher than the priority of the SL channel: the value of the logical channel priority of the UL channel is less than the second threshold.

When the value of the logical channel priority of the UL channel is less than the second threshold, the determination module 401 determines that the logical channel priority of the UL channel is higher than the logical channel priority of the SL channel, that is, the priority of the UL channel is higher than the priority of the SL channel. At this point, the communication module 403 preferentially transmits the UL traffic on the UL channel.

Alternatively, the priority of the UL channel may be determined to be higher than the priority of the SL channel in another implementation mode: a latency parameter of a UL packet is less than the first latency threshold.

When the latency parameter of the UL packet is less than the first latency threshold, it means that the latency of the UL packet is small, and the UL packet may be preferentially transmitted, that is, the priority of the UL channel is higher than the priority of the SL channel.

In an embodiment, when a packet for multiple retransmissions is configured on the SL channel, the embodiment of the present application provides an implementation mode of determining that the priority of the UL channel is higher than the priority of the SL channel: the communication module 403 receives an indication message sent by the network side through a system message or an RRC message, where the indication message is used for indicating that the priority of UL MAC PDU initial transmission traffic is higher than a priority of SL MAC PDU retransmission traffic, where the SL MAC PDU retransmission traffic is transmitted on the SL channel and the UL MAC PDU initial transmission traffic is transmitted on the UL channel.

It is to be noted that the above-mentioned retransmission includes two cases:

non-feedback-based retransmission and feedback-based retransmission.

If the comparison result is that the priority of the SL channel is higher than the priority of the UL channel, the data transmission apparatus selects any one of the SL channel or the UL channel to transmit the traffic.

Alternatively, the data transmission apparatus compares the priority of the SL channel with the priority of the UL channel based on at least one of a resource type, a packet error rate or a packet latency parameter.

In addition, when the SL traffic includes LTE SL traffic and NR SL traffic, if the value of the logical channel priority in the LTE SL MAC PDU is less than the value of the logical channel priority in the NR SL MAC PDU, the communication module 403 preferentially transmits the LTE SL traffic.

When the data transmission apparatus accesses multiple cells in a multi-connection manner, if the determination module 401 determines that the value of the logical channel priority in the LTE SL MAC PDU is less than an LTE threshold, the communication module 403 preferentially transmits the LTE SL traffic.

If the determination module 401 determines that the value of the logical channel priority in the NR SL MAC PDU is less than an NR threshold, the communication module 403 preferentially transmits the NR SL traffic.

The LTE threshold and the NR threshold are sent by the network side through a system message or an RRC message to the communication module.

When the data transmission apparatus does not configure the logical channel priority of the SL channel, the communication module 403 is configured to receive a correspondence between a PFI/PQI and a logical channel priority sent by the network side through a system message or an RRC message.

The determination module 401 is configured to determine the logical channel priority of the SL channel according to the correspondence.

When the SL traffic includes LTE SL traffic and NR SL traffic, if the data transmission apparatus cannot simultaneously transmit the LTE SL traffic and the NR SL traffic, the embodiment of the present application provides an optional implementation mode: if the value of the logical channel priority in an LTE SL MAC PDU is less than a value of the logical channel priority in an NR SL MAC PDU, the communication module 403 preferentially transmits the LTE SL traffic.

Otherwise, if the value of the logical channel priority in the LTE SL MAC PDU is greater than the value of the logical channel priority in the NR SL MAC PDU, the communication module 403 preferentially transmits the NR SL traffic.

When the data transmission apparatus accesses multiple cells in a multi-connection manner and needs to simultaneously transmit NR SL traffic, LTE SL traffic, NR UL traffic, and LTE UL traffic, if the determination module 401 determines that the data transmission apparatus cannot simultaneously transmit all SL traffic (for example, NR SL traffic and LTE SL traffic) and all UL traffic (for example, NR UL traffic and LTE UL traffic), the embodiment of the present application provides the optional implementation modes described below.

The comparison module 402 compares the priority of an NR SL logical channel, the priority of an LTE SL PPPP, the priority of an NR UL logical channel and the priority of an LTE UL logical channel, and the communication module 403 preferentially transmits traffic having a higher priority.

Alternatively, the comparison module 402 compares the value of the logical channel priority in the LTE SL MAC PDU with an LTE threshold, and if the value of the logical channel priority in the LTE SL MAC PDU is less than the LTE threshold, the priority of the LTE SL traffic is higher than the priority of the LTE UL traffic, and the communication module 403 preferentially transmits the LTE SL traffic.

Alternatively, the comparison module 402 compares the value of the logical channel priority in the NR SL MAC PDU with an NR threshold, and if the value of the logical channel priority in the NR SL MAC PDU is less than the NR threshold, the priority of the NR SL traffic is higher than the priority of the NR UL traffic, and the communication module 403 preferentially transmits the NR SL traffic.

The LTE threshold and the NR threshold are sent by the network side through a system message or an RRC message to the data transmission apparatus.

When the data transmission apparatus accesses a certain cell and needs to simultaneously transmit NR SL traffic, LTE SL traffic and UL data traffic, and if the determination module 401 determines that data transmission apparatus cannot simultaneously transmit the SL traffic and the UL traffic, the embodiment of the present application provides an optional implementation mode: the comparison module 402 compares the logical channel priority of the UL channel, the logical channel priority of NR SL and the priority of LTE SL PPPP, and the communication module 403 preferentially transmits traffic having a higher priority.

When the data transmission apparatus accesses a certain base station and needs to simultaneously transmit NR SL traffic, LTE SL traffic and UL data traffic, if the determination module 401 determines that data transmission apparatus cannot simultaneously transmit the SL traffic and the UL traffic, the embodiment of the present application provides the optional implementation modes described below.

If the value of the logical channel priority of the NR SL is less than a preset threshold and the value of the logical channel priority of the LTE SL is greater than the preset threshold, the priority of the NR SL traffic is determined to be higher, and then the communication module 403 preferentially transmits the NR SL traffic, then transmits the LTE SL traffic, and when the communication module 403 has transmission capability or transmission resources, the communication module 403 transmits the UL data traffic.

Alternatively, if the value of the logical channel priority of the LTE SL is less than the preset threshold and the value of the logical channel priority of the NR SL is greater than the preset threshold, the priority of the LTE SL traffic is determined to be higher, and then the communication module 403 preferentially transmits the LTE SL traffic first, then transmits the UL SL traffic; and when the communication module 403 has transmission capability or transmission resources, the communication module 403 transmits the UL data traffic.

Alternatively, if both the value of the logical channel priority of the NR SL and the value of the logical channel priority of the LTE SL are less than the preset threshold, the comparison module 402 compares the logical channel priority of the NR SL with the priority of the LTE SL PPPP, and the communication module 403 preferentially transmits the SL traffic having a higher priority. When the communication module 403 has transmission capability or transmission resources, the communication module 403 sequentially transmits the SL traffic having a lower priority between the two types of SL traffic as well as the UL data traffic.

Alternatively, if both the value of the logical channel priority of the NR SL and the value of the logical channel priority of the LTE SL are less than the preset threshold, the comparison module 402 compares the logical channel priority of the NR SL with the priority of the LTE SL PPPP, and the communication module 403 preferentially transmits the UL data traffic. When the communication module 403 has transmission capability or transmission resources, the communication module 403 sequentially transmits the two SL traffic according to the order of priorities.

The data transmission apparatus described in the above embodiment can execute the data transmission method provided by any embodiment of the present application and has functional modules and beneficial effects corresponding to the executed method.

Figure 5:
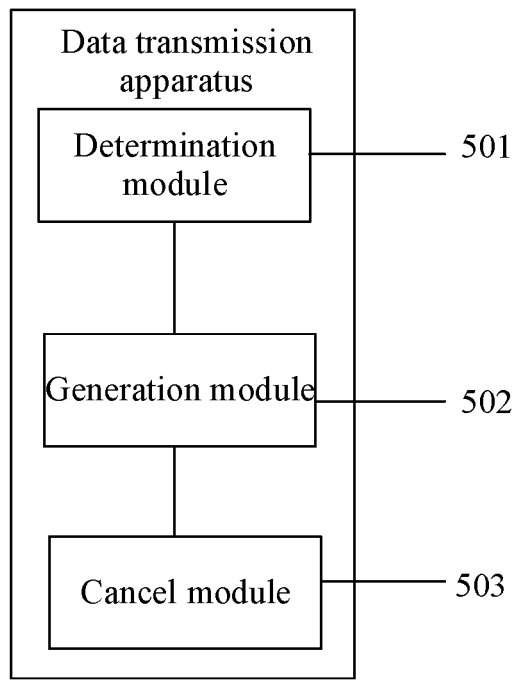
FIG. 5 is a structural schematic diagram of another data transmission apparatus according to an embodiment.

FIG. 5 is a structural schematic diagram of another data transmission apparatus according to an embodiment. As shown in FIG. 5, the apparatus provided by this embodiment includes a determination module 501 and a generation module 502.

The determination module 501 is configured to determine that at least one SL BSR is triggered and not canceled.

Exemplarily, in this embodiment of the present application, the determination module may be disposed in a MAC entity of the data transmission apparatus.

The generation module 502 is configured to in a case where a UE is allocated with a UL resource at a TTI and the UL resource is capable of accommodating the SL BSR and a sub-header of the SL BSR, generate an SL BSR MAC CE.

In an embodiment, in a case where the condition that the UE is allocated with a UL resource at a TTI and the UL resource is capable of accommodating the SL BSR and a sub-header of the SL BSR is satisfied, in this embodiment of the present application, the data transmission apparatus further includes a start module.

The start module is configured to if none of the generated SL BSRs is a truncated SL BSR, start or restart a periodic SL BSR timer; and start or restart a retransmission SL BSR timer.

Otherwise, if the condition that the UE is allocated with a UL resource at a TTI and the UL resource is capable of accommodating the SL BSR and a sub-header of the SL BSR is not satisfied but the regular sidelink BSR is triggered, the start module is further configured to, if no uplink resource assignment is configured or if the available UL resources do not satisfy the LCP mapping limit that triggers the SL BSR, trigger an SL scheduling request (SR).

In addition, the data transmission apparatus further includes a cancel module 503.

The cancel module 503 is configured to in a case where the UE has no data transmitted through an SL unicast logical channel, cancel all SL BSRs triggered by SL unicast.

Alternatively, the cancel module 503 is configured to, in a case where the UE has no specific target identifier or data of an SL unicast logical channel of a target UE identifier, cancel all SL BSRs triggered by an SL unicast logic related to the target identifier or the target UE identifier.

In an embodiment, when the MAC PDU is assembled and the MAC PDU includes an SL BSR triggered by the latest event or when the SL resource assignment is capable of accommodating all SL data to be transmitted, all SRs triggered by the SL BSR but not yet transmitted are canceled.

Otherwise, when the MAC PDU is assembled and the MAC PDU includes an UL BSR triggered by the latest event or when the UL resource assignment is capable of accommodating all UL data to be transmitted, all SRs triggered by the UL BSR but not yet transmitted are canceled.

Figure 6:
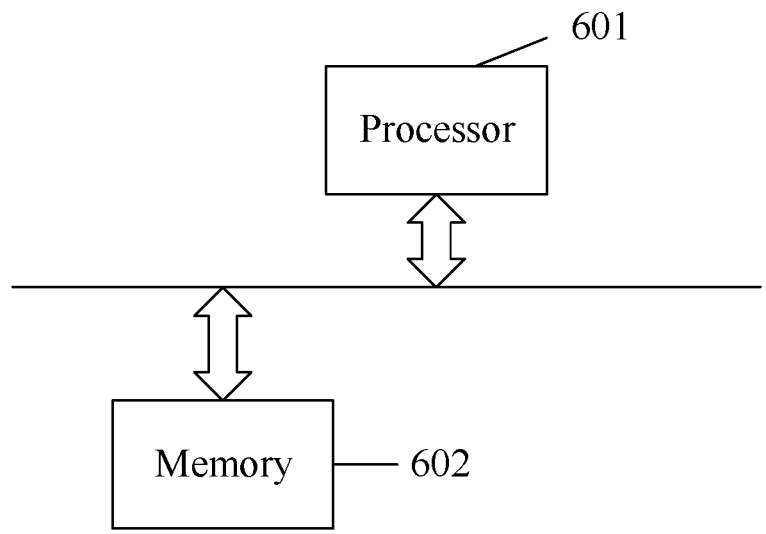
FIG. 6 is a structural schematic diagram of a device according to an embodiment.

FIG. 6 is a structural schematic diagram of a device according to an embodiment. As shown in FIG. 6, the device includes a processor 601 and a memory 602. The number of processors 601 in the device may be one or more, and one processor 601 is illustrated as an example in FIG. 6. The processor 601 and the memory 602 in the device may be connected through a bus or in other manners, and in FIG. 6, the connection through the bus is illustrated as an example.

As a computer-readable storage medium, the memory 602 may be configured to store software programs, computer executable programs and modules, such as program instructions/modules corresponding to the data transmission method in the embodiments of the present application (for example, the determination module 401, the comparison module 402, and the communication module 403 in the data transmission apparatus). The processor 601 runs the software programs, instructions or modules stored in the memory 602 to perform the above-described data transmission method.

The memory 602 may mainly include a program storage region and a data storage region, where the program storage region may store an operating system and an application program required by at least one function while the data storage region may store data created depending on use of a device. In addition, the memory 602 may include a high-speed random access memory, and may also include a non-volatile memory such as at least one disk memory, flash memory or other non-volatile solid-state memories.

Figure 7:
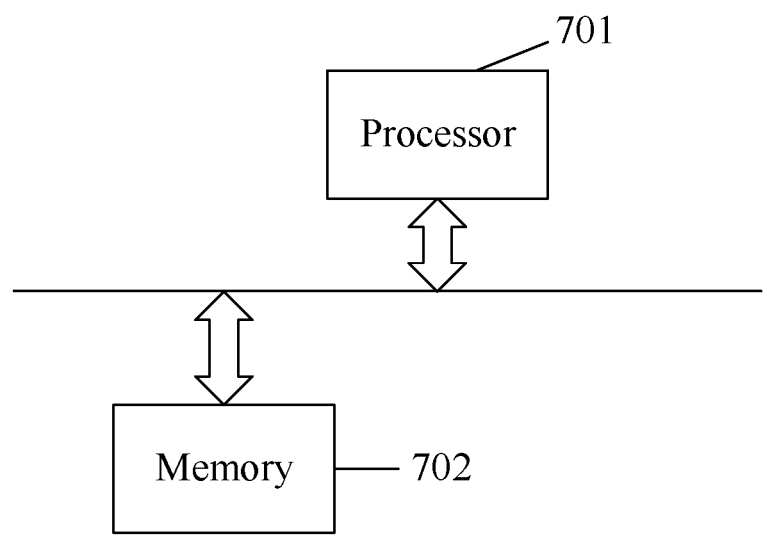
FIG. 7 is a structural schematic diagram of another device according to an embodiment.

FIG. 7 is a structural schematic diagram of another device according to an embodiment. As shown in FIG. 7, the device includes a processor 701 and a memory 702. The number of processors 701 in the device may be one or more, and one processor 701 is illustrated as an example in FIG. 7. The processor 701 and the memory 702 in the device may be connected through a bus or in other manners, and in FIG. 7, the connection through the bus is illustrated as an example.

As a computer-readable storage medium, the memory 702 may be configured to store software programs, computer-executable programs and modules, such as program instructions/modules corresponding to the data transmission method in the embodiments of the present application (for example, the determination module 501, the generation module 50, and the cancel module 503 in the data transmission apparatus). The processor 701 runs the software programs, instructions or modules stored in the memory 702 to perform the above-described data transmission method.

The memory 702 may mainly include a program storage region and a data storage region, where the program storage region may store an operating system and an application program required by at least one function while the data storage region may store data created depending on use of a device. In addition, the memory 702 may include a high-speed random access memory, and may also include a non-volatile memory such as at least one disk memory, flash memory or other non-volatile solid state memories.

The embodiment of the present application further provides a storage medium including computer-executable instructions. The computer-executable instructions, when executed by a processor of a computer, perform a data transmission method, and the method includes that: in a case where a UE determines that the UE is incapable of simultaneously transmitting UL traffic and SL traffic, the UE compares a priority of a UL channel with a priority of an SL channel, and transmits traffic according to a comparison result.

The embodiment of the present application further provides a storage medium including computer-executable instructions. The computer-executable instructions, when executed by a processor of a computer, perform a data transmission method, and the method includes that: if at least one SL BSR is triggered and not canceled and in a case where a UE is allocated with a UL resource at a TTI and the UL resource is capable of accommodating the SL BSR and a sub-header of the SL BSR, the UE generates an SL BSR MAC CE.

The above are only exemplary embodiments of the present application and are not intended to limit the scope of the present application.

It is to be understood by those skilled in the art that the term "user terminal" covers any suitable type of wireless user devices, for example, a mobile phone, a portable data processing apparatus, a portable web browser, or a vehicle-mounted mobile station.

In general, various embodiments of the present application may be implemented in hardware or special purpose circuits, software, logic or any combination thereof. For example, the above-mentioned embodiments, in some aspects, may be implemented in hardware while in other aspects, the embodiments may be implemented in firmware or software that may be executed by a controller, a microprocessor, or other computing devices, which is not limited thereto.

The embodiments of the present application may be implemented by computer program instructions executed by a data processor of a mobile device, such as in the processor entity, or by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow in drawings of the present application may represent program steps, or interconnected logic circuits, modules, and functions, or a combination of program steps and logic circuits, modules and functions. The computer programs may be stored in a memory. The memory may be of any type suitable to the local technical environment and may be implemented using any suitable data storage technology such as, but not limited to, a read-only memory (ROM), a random access memory (RAM), an optical memory apparatus and system (digital video disc (DVD) or compact disc (CD)), and the like. The computer-readable storage medium may include a non-transitory storage medium. The data processor may be of any type suitable to the local technical environment, such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A data transmission method, comprising:
   in a case where a user equipment (UE) determines that the UE is incapable of simultaneously transmitting uplink (UL) traffic and sidelink (SL) traffic, comparing a priority of a UL channel with a priority of an SL channel; and
   transmitting, by the UE, traffic according to a comparison result;
   wherein transmitting, by the UE, the traffic according to the comparison result comprises: in a case where the comparison result is that the priority of the SL channel is higher than the priority of the UL channel, transmitting, by the UE, the SL traffic;
   wherein the priority of the SL channel being higher than the priority of the UL channel comprises that: a logical channel priority of the SL channel is higher than a logical channel priority of the UL channel;

wherein the logical channel priority of the SL channel being higher than the logical channel priority of the UL channel comprises: a value of the logical channel priority of the SL channel being less than a value of the logical channel priority of the UL channel and a value of a priority of a media access control (MAC) control element (CE);

wherein the value of the priority of the MAC CE is acquired in the following manner:

receiving, by the UE, the value of the priority of the MAC CE sent by a network side through a system message or a radio resource control (RRC) message, wherein the value of the priority of the MAC CE comprises a value of a priority of each MAC CE of N MAC CEs, a value of a priority uniformly configured by the network side for N MAC CEs, a value of a priority configured by the network side for a non-padding MAC CE, or a value of a priority configured by the network side for a padding MAC CE, wherein N is a natural number.

2. The data transmission method of claim 1, wherein the logical channel priority of the SL channel being higher than the logical channel priority of the UL channel further comprises at least one of the following:

a value of the logical channel priority of the SL channel being less than a value of the logical channel priority of the UL channel;

a value of the logical channel priority of the SL channel being less than a first threshold and the value of the logical channel priority of the SL channel being less than a value of the logical channel priority of the UL channel;

a value of the logical channel priority of the UL channel being greater than a second threshold and a value of the logical channel priority of the SL channel being less than a first threshold;

a value of the logical channel priority of the UL channel being greater than a second threshold and a latency parameter of an SL packet being less than a first latency threshold.

3. The data transmission method of claim 2, wherein the first latency threshold is acquired in the following manner:

receiving, by the UE, the first latency threshold sent by the network side through a system message or an RRC message.

4. The data transmission method of claim 2, further comprising: receiving, by the UE, the first threshold, the second threshold, the third threshold or the fourth threshold sent by a network side through a system message or an RRC message.

5. The data transmission method of claim 1, wherein in a case where a MAC protocol data unit (PDU) of the UE comprises no MAC CE, the logical channel priority of the SL channel being higher than the logical channel priority of the UL channel comprises at least one of the following:

a value of the logical channel priority of the SL channel being greater than a first threshold and the value of the logical channel priority of the SL channel being less than a value of the logical channel priority of the UL channel; or a latency parameter of an SL packet being greater than a first latency threshold and a value of the logical channel priority of the SL channel being less than a value of the logical channel priority of the UL channel.

6. The data transmission method of claim 5, further comprising: receiving, by the UE, the first threshold, the second threshold, the third threshold or the fourth threshold sent by a network side through a system message or an RRC message.

7. The data transmission method of claim 1, wherein the priority of the SL channel being higher than the priority of the UL channel comprises:

a priority of SL MAC PDU retransmission traffic being higher than a priority of UL MAC PDU initial transmission traffic;

wherein the SL MAC PDU retransmission traffic is transmitted on the SL channel and the UL MAC PDU initial transmission traffic is transmitted on the UL channel.

8. The data transmission method of claim 7, wherein the priority of the SL MAC PDU retransmission traffic being higher than the priority of the UL MAC PDU initial transmission traffic comprises at least one of the following:

a value of a logical channel priority of the SL channel being less than a first threshold and a value of a logical channel priority of the UL channel being greater than a third threshold;

a value of a priority of the SL MAC PDU retransmission traffic being less than a fourth threshold; or receiving, by the UE, an indication message sent by a network side through a system message or an RRC message, wherein the indication message indicates that the priority of the SL MAC PDU retransmission traffic is higher than the priority of the UL MAC PDU initial transmission traffic.

9. The data transmission method of claim 8, further comprising: receiving, by the UE, the first threshold, the second threshold, the third threshold or the fourth threshold sent by a network side through a system message or an RRC message.

10. The data transmission method of claim 1, wherein in a case where the SL traffic comprises Long Term Evolution (LTE) SL traffic and New Radio (NR) SL traffic, the method further comprises:

in a case where a value of a logical channel priority in an LTE SL MAC PDU is less than a value of a logical channel priority in an NR SL MAC PDU, transmitting preferentially, by the UE, the LTE SL traffic.

11. The data transmission method of claim 1, wherein in a case where the UE accesses a plurality of cells in a multi-connection manner, the method further comprises:

in a case where the UE determines that a value of a logical channel priority in an LTE SL MAC PDU is less than an LTE threshold, transmitting preferentially, by the UE, the LTE SL traffic; and in a case where the UE determines that a value of a logical channel priority in an NR SL MAC PDU is less than an NR threshold, transmitting preferentially, by the UE, the NR SL traffic;

wherein the LTE threshold and the NR threshold are sent by a network side through a system message or an RRC message to the UE.

12. The data transmission method of claim 1, wherein in a case where the UE does not configure a logical channel priority of the SL channel, the method further comprises:

receiving, by the UE, a correspondence, sent by the network side through a system message or an RRC message, between a PC5 Quality of Service (QOS) flow identifier/PC5 5th generation mobile communication technology (5G) QOS identifier (PFI/PQI) and a logical channel priority; and determining, by the UE, the logical channel priority of the SL channel according to the correspondence.

13. The data transmission method of claim 1, further comprising: in a case where the comparison result is that the priority of the SL channel is equal to the priority of the UL channel, selecting, by the UE, one of the SL channel or the UL channel to transmit the traffic; or comparing by the UE based on at least one of a resource type, a packet error rate or a packet latency parameter, the priority of the SL channel with the priority of the UL channel.

14. A non-transitory computer-readable storage medium storing a computer program, wherein the computer program, when executed by a processor, implements the data transmission method of claim 1.

15. A data transmission device, comprising a memory and a processor, wherein the memory stores a program which, when read and executed by the processor, causes the processor to perform:
- in a case where a user equipment (UE) determines that the UE is incapable of simultaneously transmitting uplink (UL) traffic and sidelink (SL) traffic, comparing a priority of a UL channel with a priority of an SL channel; and
- transmitting, by the UE, traffic according to a comparison result;
- wherein transmitting, by the UE, the traffic according to the comparison result comprises:
- in a case where the comparison result is that the priority of the SL channel is higher than the priority of the UL channel, transmitting, by the UE, the SL traffic;
- wherein the priority of the SL channel being higher than the priority of the UL channel comprises that: a logical channel priority of the SL channel is higher than a logical channel priority of the UL channel;
- wherein the logical channel priority of the SL channel being higher than the logical channel priority of the UL channel comprises: a value of the logical channel priority of the SL channel being less than a value of the logical channel priority of the UL channel and a value of a priority of a media access control (MAC) control element (CE);
- wherein the value of the priority of the MAC CE is acquired in the following manner:
- receiving, by the UE, the value of the priority of the MAC CE sent by a network side through a system message or a radio resource control (RRC) message, wherein the value of the priority of the MAC CE comprises a value of a priority of each MAC CE of N MAC CEs, a value of a priority uniformly configured by the network side for N MAC CEs, a value of a priority configured by the network side for a non-padding MAC CE, or a value of a priority configured by the network side for a padding MAC CE, wherein N is a natural number.

16. The data transmission device of claim 15, wherein the logical channel priority of the SL channel being higher than the logical channel priority of the UL channel further comprises at least one of the following:
- a value of the logical channel priority of the SL channel being less than a value of the logical channel priority of the UL channel;
- a value of the logical channel priority of the SL channel being less than a first threshold and the value of the logical channel priority of the SL channel being less than a value of the logical channel priority of the UL channel;
- a value of the logical channel priority of the UL channel being greater than a second threshold and a value of the logical channel priority of the SL channel being less than a first threshold;
- a value of the logical channel priority of the UL channel being greater than a second threshold and a latency parameter of an SL packet being less than a first latency threshold;
- a latency parameter of an SL packet being less than a first latency threshold and a value of the logical channel priority of the SL channel being less than a value of the logical channel priority of the UL channel; or
- a value of the logical channel priority of the SL channel being less than a first threshold.

17. The data transmission device of claim 16, wherein the communication module is configured to receive the first latency threshold sent by the network side through a system message or an RRC message.

18. The data transmission device of claim 15, wherein in a case where a MAC protocol data unit (PDU) of the UE comprises no MAC CE, the logical channel priority of the SL channel being higher than the logical channel priority of the UL channel comprises at least one of the following:
- a value of the logical channel priority of the SL channel being greater than a first threshold and the value of the logical channel priority of the SL channel being less than a value of the logical channel priority of the UL channel; or
- a latency parameter of an SL packet being greater than a first latency threshold and a value of the logical channel priority of the SL channel being less than a value of the logical channel priority of the UL channel.

19. The data transmission device of claim 15, wherein the priority of the SL channel being higher than the priority of the UL channel comprises:
- a priority of SL MAC PDU retransmission traffic being higher than a priority of UL MAC PDU initial transmission traffic;
- wherein the SL MAC PDU retransmission traffic is transmitted on the SL channel and the UL MAC PDU initial transmission traffic is transmitted on the UL channel.

20. The data transmission device of claim 19, wherein the priority of the SL MAC PDU retransmission traffic being higher than the priority of the UL MAC PDU initial transmission traffic comprises at least one of the following:
- a value of a logical channel priority of the SL channel being less than a first threshold and a value of a logical channel priority of the UL channel being greater than a third threshold;
- a value of a priority of the SL MAC PDU retransmission traffic being less than a fourth threshold; or
- receiving, by the UE, an indication message sent by a network side through a system message or an RRC message, wherein the indication message indicates that the priority of the SL MAC PDU retransmission traffic is higher than the priority of the UL MAC PDU initial transmission traffic.

* * * * *